United States Patent [19]

Mann

[11] 4,167,113
[45] Sep. 11, 1979

[54] DISPLAY SYSTEMS

[75] Inventor: George Mann, Winchcombe, England

[73] Assignee: Smiths Industries Limited, London, England

[21] Appl. No.: 855,111

[22] Filed: Nov. 25, 1977

[30] Foreign Application Priority Data

Dec. 3, 1976 [GB] United Kingdom ............... 50540/76

[51] Int. Cl.$^2$ ............................................ G01C 21/00
[52] U.S. Cl. .................................. 73/178 R; 350/174; 358/250
[58] Field of Search ............. 73/178 R; 358/250, 231, 358/237, 222, 103; 350/16, 174

[56] References Cited

U.S. PATENT DOCUMENTS

3,205,303 9/1965 Bradley ................................ 358/250

FOREIGN PATENT DOCUMENTS

1187473 2/1965 Fed. Rep. of Germany ........... 358/222

*Primary Examiner*—Donald O. Woodiel
*Attorney, Agent, or Firm*—Pollock, Vande Sande & Priddy

[57] ABSTRACT

A head-up display system for an aircraft has a display unit which projects a display of symbology representing the aircraft flight parameters onto a separately mounted partially-transparent reflector positioned in front of the aircraft pilot, so that the pilot sees an image of the display against the external scene. The display unit has a sensor which receives an image of the display via the reflector. The sensor responds to displacement of this image from a reference established with respect to the display unit, caused by movement of the reflector relative to the display unit, and the display is correspondingly modified to compensate for such movement. The display unit may include a cathode-ray tube for providing the display which can be modified by adjustment of the deflection of the cathode-ray beam. In this case the reference established with respect to the display unit may be an instantaneous point image of the cathode-ray beam. A light source may be mounted with the display unit and the sensor may be arranged to respond additionally to displacement of an image of this light source received via the reflector. The light source may be located at a position spaced from the center of the display. Two sensors may be provided in the display unit, one of which receives an image of the display directly from within the unit, and the other of which receives an image of the display via the reflector, the display being modified in accordance with the difference between the outputs of the two sensors. The sensors may each be formed by a matrix array of photo-responsive devices.

13 Claims, 6 Drawing Figures

DISPLAY SYSTEMS

This invention relates to display systems.

The invention is particularly concerned with aircraft head-up display systems, that is to say, with systems in which the display of symbols generated on the screen of a cathode-ray tube is projected onto a partially-transparent reflector to provide an image of the display against the background of the external scene through the aircraft windscreen.

In previous systems the display unit containing the cathode-ray tube is conveniently mounted rigidly in the aircraft together with the reflector to ensure that the projected display can be appropriately related to the external scene. The reflector, furthermore, is rigidly mounted on the display unit to ensure freedom from the effects of vibration or other operational displacements between the display unit and the reflector that would otherwise cause oscillation or other stabilization errors in location of the symbology as viewed in the reflector. There are, however, disadvantages in the need in this respect to mount the normally-bulky display unit with the reflector immediately in front of the pilot or other crew member of the aircraft.

It is an object of the present invention to provide a form of display system that may be used to overcome these disadvantages.

According to one aspect of the present invention there is provided a display system including a display unit and an optical element, the system being arranged such that a display provided by the display unit is to be viewed via the optical element, wherein means is provided to respond to displacement from a reference established with respect to said display unit, of an image that is derived via said optical element from the display, and wherein means is arranged to modify said display in accordance with the said response in such a manner as to compensate for movement of said optical element relative to said display unit.

The display unit may therefore be mounted separately of the optical element without any undue degredation in the display viewed via the optical element caused by, for example, vibration.

The display unit may include a cathode-ray tube to provide the display, and in these circumstances the reference established with respect to the display unit may be a point image of the cathode-ray beam or trace appearing on the cathode-ray tube screen. In the latter case the image derived via the optical element may be an image of the cathode-ray beam or trace, and the modification of the display performed may then be applied by adjustment of deflection of the cathode-ray beam in such a manner as to cancel out displacement between the two images. Images may additionally be derived from one or more light sources rigidly-mounted with respect to the cathode-ray tube within the display unit.

The said optical element of the display system may be a partially-transparent reflector and in this respect the system may be a head-up display system where the reflector is located in front of the observer and the display unit for projecting a display onto the reflector is located elsewhere, for example, behind the observer.

A display system in accordance with the present invention, for use in providing a head-up display in a military aircraft, will now be described, by way of example, with reference to the accompanying drawings, in which.

Figure 1:
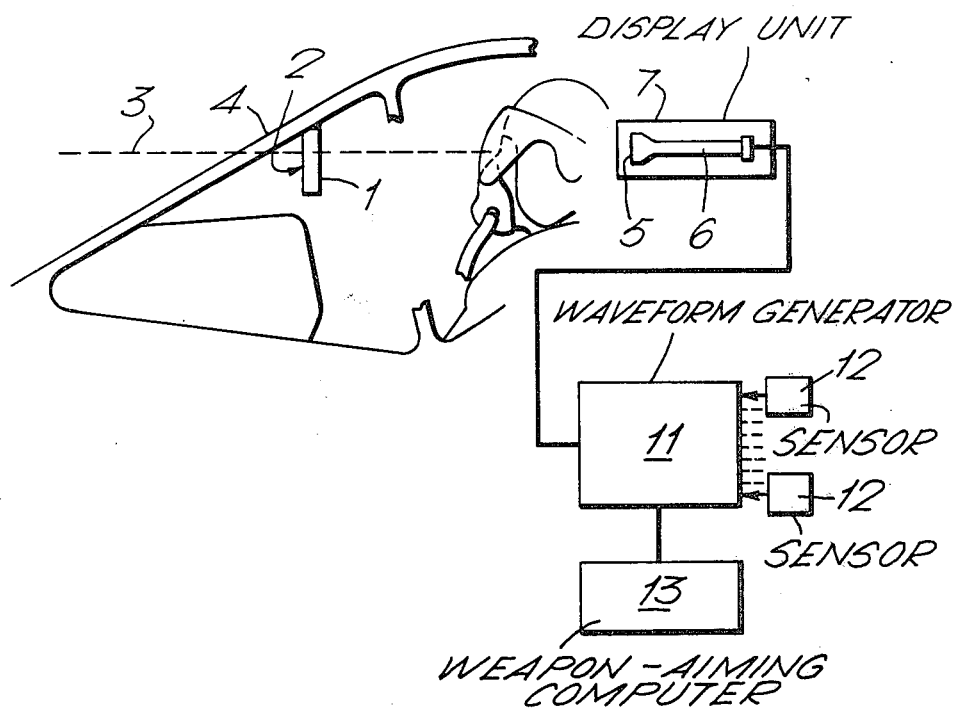
FIG. 1 is a schematic representation of the head-up display system as installed in the aircraft.

Referring to FIG. 1, a partially-transparent reflector 1 of an optical combiner unit 2 is mounted in front of the pilot inclined to his line-of-sight 3 through the aircraft-windscreen 4. A display of flight parameters and weapon-aiming information is projected onto the reflector 1 so that the pilot sees the display image in his line of sight 3 against the background of the external scene through the windscreen 4. The display is projected from the screen 5 of a cathode-ray tube 6 within a display unit 7 that is mounted behind the pilot, and is collimated within the unit 7 so as to be seen by the pilot substantially at infinity in the reflector 7.

Figure 2:
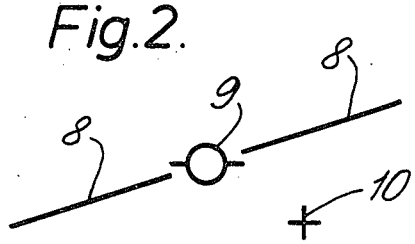
FIG. 2 is illustrative of symbology involved in the display provided by the system of FIG. 1.

The information displayed in the reflector 1 includes, as illustrated in FIG. 2, analogue presentation of aircraft attitude involving an horizon symbol 8 (in the form of two spaced and aligned bars) and a flight-vector symbol 9 (in the form of a circle with short laterally-extending arms). The flight-vector symbol 9 is displayed on the screen 5 of the cathode-ray tube 6 in such a manner that its image remains stationary in the pilot's field of view through the reflector 1. The horizon symbol 8, however, moves so as to be seen by the pilot to be displaced angularly, and also up and down, relative to the symbol 9, in accordance with bank and pitching movements respectively of the aircraft. The weapon-aiming information on the other hand, involves a marker symbol 10 (illustrated in the form of a cross) that is moved in the display on the screen 5 so as to be seen by the pilot in image against the external scene through the windscreen 4. The symbol 10 denotes in relation to the external scene the line of aim of the aircraft weapon-system (or a selected part of it) to an identified target, and the pilot's task is to manoeuvre the aircraft to bring the symbol 10 within the flight-vector symbol 9 and accordingly align the aircraft appropriately for firing of the weapon system.

The electric signals required to produce the display of flight and weapon-aiming information on the screen 5, are supplied to the cathode-ray tube 6 from a waveform generator 11. The waveform generator 11 generates the relevant video signals in accordance with signals it receives from appropriate attitude, and other, sensors 12 and a weapon-aiming computer 13 within the aircraft. In this respect it is to be understood that the display as generated and embodied in the video signals supplied to the cathode-ray tube 6, may embrace a wider variety of information than that involved in the basic form illustrated in FIG. 2. Any of the information may be presented in digital or analogue form, or both, and may be displayed on the screen 5 using cursive or raster-scan display techniques. However, for the purposes of initial description of the system of FIG. 1 use of a cursive technique, in which the cathode-ray beam is deflected in accordance with the video signals from the waveform generator 11 to trace out the display symbology, will be assumed.

Figure 3:
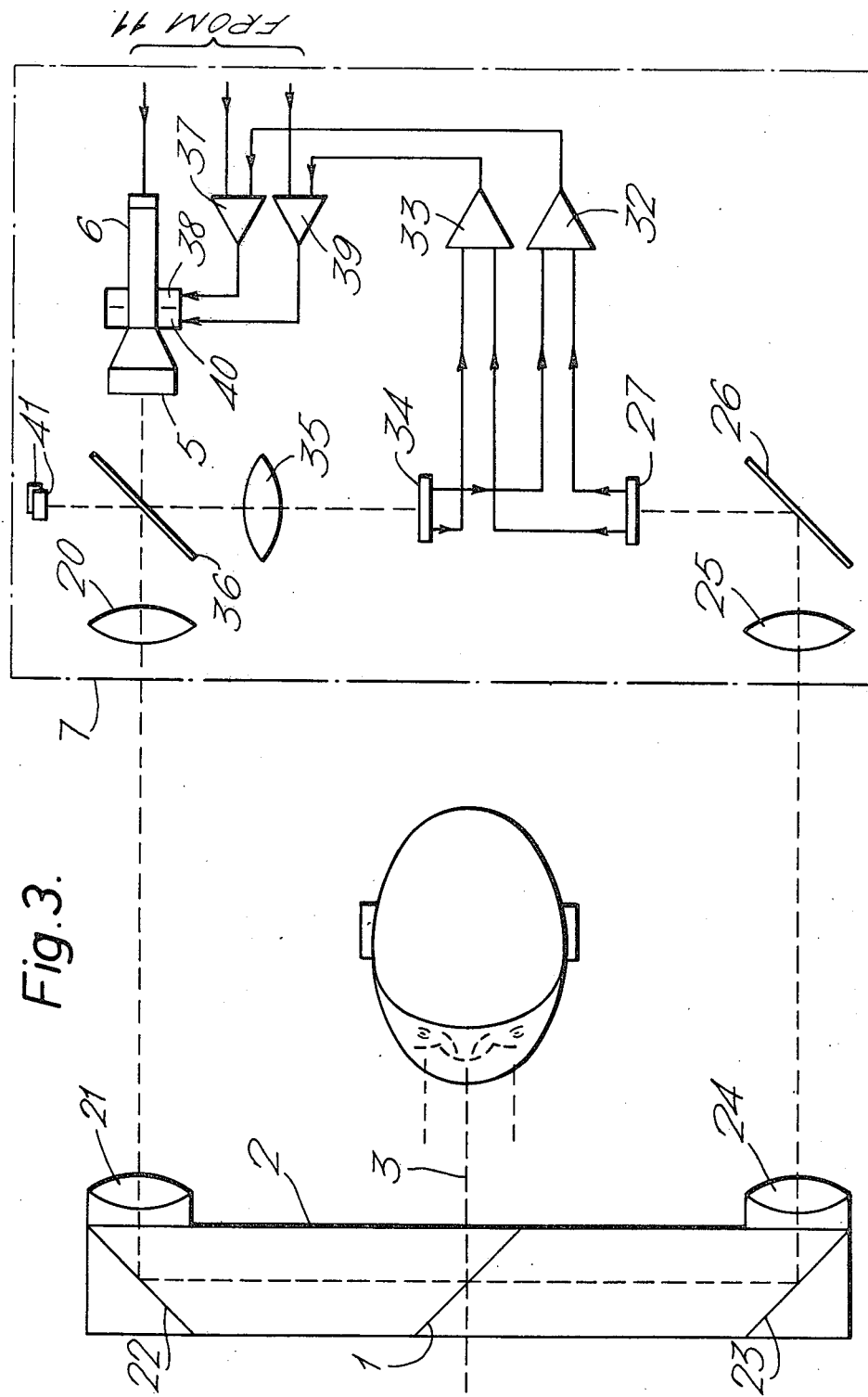
FIG. 3 is a schematic representation of the display system of FIG. 1 in plan.

Referring to FIG. 3 in addition to FIG. 1, the display unit 7 mounted behind the pilot, includes a lens 20 for projecting an image of the display on the screen 5 of the cathode-ray tube 6 into the focal plane of a lens 21 that forms part of the combiner unit 2. The collimated light from the lens 21 is reflected via a reflecting surface 22 onto the partially-transparent reflector 1 so as to be superimposed on the pilot's view of the external scene along the line-of-sight 3. The lens 20 and the pilot's eyes are desirably in conjugate foci with the lens 21 so that the exit pupil of the system is located in the plane of the eyes.

Some of the collimated light from the lens 21 passes through the reflector 1 to be reflected via a reflecting surface 23 to a lens 24. The lens 24 is similar to the lens 21 and the image of the display formed in its focal plane is focussed via a lens 25 and mirror 26 of the unit 7 onto an electro-optical position sensor 27 which provides output signals in accordance with X- and Y-coordinates of position of the image.

Figure 4:
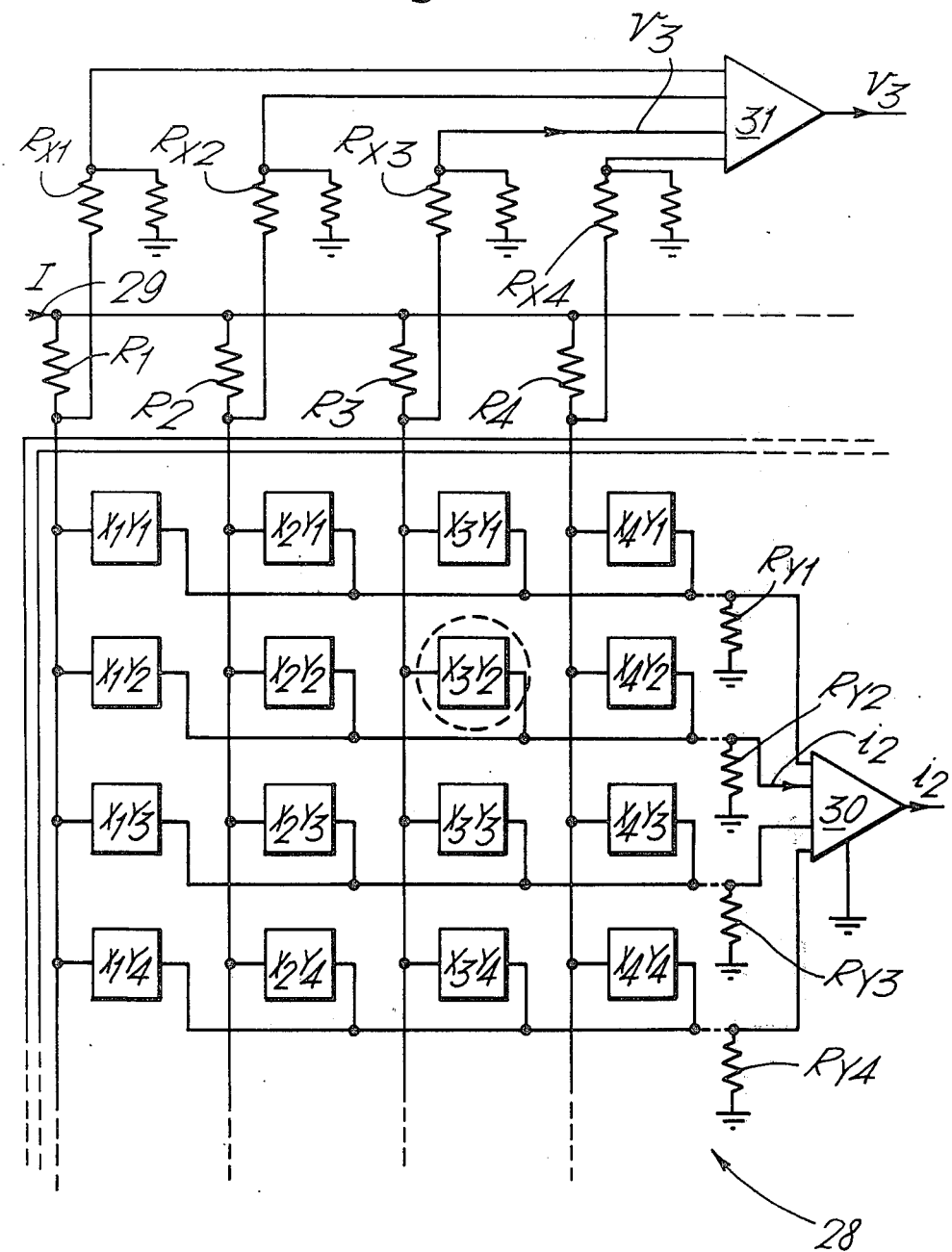
FIG. 4 illustrates part of a sensor that may be used in the display system of FIG. 1.

The sensor 27 may take many different forms, and may, for example, include a matrix array of photo-responsive devices. FIG. 4 shows a part of one such arrangement including a matrix array 28 of photo-conductive devices $X_1Y_1$ to $X_4Y_4$ which may be provided, for example, by a thin-film array of cadmium sulphide sensors. A constant current I is supplied on line 29 to each of the devices $X_1Y_1$ to $X_4Y_4$ via resistors $R_1$ to $R_4$. When a light image of the display falls on one of the devices, such as, for example, the device $X_3Y_2$, it causes it to conduct and thereby causes current to flow through the resistor $R_3$ to the current divider formed by the resistor $R_{Y2}$. The current divider $R_{Y2}$ provides a current $i_2$, proportional to the Y-coordinate of the device illuminated, which is supplied via a summing amplifier 30 for use in providing an output in accordance with the Y-coordinate of the image of the display. Similarly, a voltage is derived which is proportional to the X-coordinate of the image of the display. In this case, the voltage across the resistor $R_3$, caused by flow of current through the device $X_3Y_2$, is supplied to a voltage divider including a resistor $R_{X3}$ which provides a voltage $v_3$ which is in turn supplied via a second summing amplifier 31 for use in providing an output in accordance with the X-coordinate of the light image of the display. The sensor 27, rather than responding as the pilot does to a time-integrated form of the display image, responds to the point image of the cathode-ray beam as it traces out its cursive path across the screen 5. The sensor 27 therefore provides signals in accordance with the X- and Y-coordinates of the instantaneous position of the cathode-ray beam as represented by the image transmitted via the combiner unit 2. These signals are supplied to respective differential amplifiers 32 and 33 for comparison with reference signals derived by another electro-optical sensor 34.

The sensor 34, which like the sensor 27 may be provided by a matrix array of photo-responsive devices, derives the reference signals in accordance with the X- and Y-coordinates of the instantaneous position of an image of the cathode-ray beam produced by a lens 35 within the unit 7. The lens 35 focusses the point image on the sensor 34 from a partially-transparent reflector 36 located in the unit 7 between the screen 5 and the lens 20. Thus in contrast to the X- and Y-coordinates of instantaneous position signalled from the sensor 27, the X- and Y-coordinates signalled from the sensor 34 are unaffected by any vibration or other displacement occurring in operation between the combiner unit 2 and display unit 7. More particularly the signals supplied to the amplifiers 32 and 33 from the sensor 34 are coordinated to the instantaneous position of the point image of the cathode-ray beam within the display area, as this should appear stabilized in the reflector 1 against the external scene. Vibrations or other displacement of the unit 2 relative to the unit 7 tend to produce errors of location of the point image against the external scene through the reflector 1, but any such errors are also manifested in differences between the signals supplied by the sensor 27 and the reference signals supplied by the sensor 34. Accordingly the output signals of the amplifiers 32 and 33, derived from the differences between the two signals of each pair compared, are representative of corrections appropriate to cancellation of display-stabilization errors in the X- and Y-coordinate directions respectively.

The output signal of the amplifier 32, as appropriate for correction of the display-stabilization error in the X-coordinate direction, is added in an amplifier 37 to the X-coordinate deflection-waveform supplied from the waveform generator 11 to the X-deflection yoke 38 of the cathode-ray tube 6. Similarly, the output signal of the amplifier 33 is added as appropriate for correction of the display-stabilization error in the Y-coordinate direction, to the Y-coordinate deflection waveform in an amplifier 39 that supplies the Y-deflection yoke 40 of the cathode-ray tube 6 from the waveform generator 11. There is thus established a closed-loop control system for cancelling out the effects of vibrations or other operational displacements between the combiner unit 2 and the display unit 7. The need for rigid mounting of the unit 2 is thereby avoided; the unit 2 may therefore be mounted independently of the unit 7 on, for example, the cockpit canopy.

The control loop established for the cursive display may be supplemented for any symbology written outside the central display-area by use of one or more auxiliary light sources. For example as illustrated in FIG. 3, two light-emitting diodes 41 are mounted with a slight lateral spacing from one another to superimpose, via the reflector 36, two points of light outside the exit pupil for the principal-symbology image projected from the screen 5 onto the reflector 1. Any error in stabilization of these point images in the reflector 1 is manifested in differences between, on the one hand, the X- and Y-coordinates of their images projected onto the sensor 27, and on the other hand, the reference X- and Y-coordinates established at the sensor 34 by the images transmitted through the reflector 36 directly from the diodes 41. The signals in accordance with these differences supplied from the amplifiers 32 and 33 to the amplifiers 37 and 39 respectively, serve to ensure appropriate supplementary correction of stabilization in rotation as well as in the X- and Y-directions.

In those circumstances in which raster-scan, rather than cursive, display techniques are used the corrective control-signals derived by the amplifiers 32 and 33 from the output signals of the sensors 27 and 34 would be applied to effect appropriate displacements to the line-scan and frame-scan time-base waveforms which in this case are supplied to the amplifiers 37 and 39 from the waveform generator 11 to provide the raster scan.

The light sources could be mounted to provide point (or perhaps, line) images within the exit pupil; the light may be infra-red, or the sources may be pulse-energized, such that these images are not visible to the eye.

It is important to note that the reflecting surface 23 is to be rigidly fixed with respect to the reflector 1. Consequently the surfaces 22 and 23 together with the lenses 21 and 24 and the reflector 1 can conveniently be integrated into a single element. More especially the unit 2 can be conveniently provided as angled surfaces 22 and 23 of a solid optical element, with the reflector 1 established as the interface between two parts and the lenses 21 and 24 formed integrally or alternatively cemented, or otherwise rigidly secured, in place.

Variation in system configuration from that illustrated in FIG. 3 may readily be provided. For example, a single path between the units 2 and 7 may be utilized, by positioning a plain mirror at right-angles to the light passing through the reflector 1 to reflect this back via the reflector 1, the surface 22, the lenses 21 and 20 and thence to the sensor 27 appropriately relocated. Such modification may more readily enable orientation of the system of FIG. 3 into a vertical, rather than the horizontal, plane. Further modifications of the system of FIG. 3 are illustrated in FIGS. 5 and 6.

Figure 5:
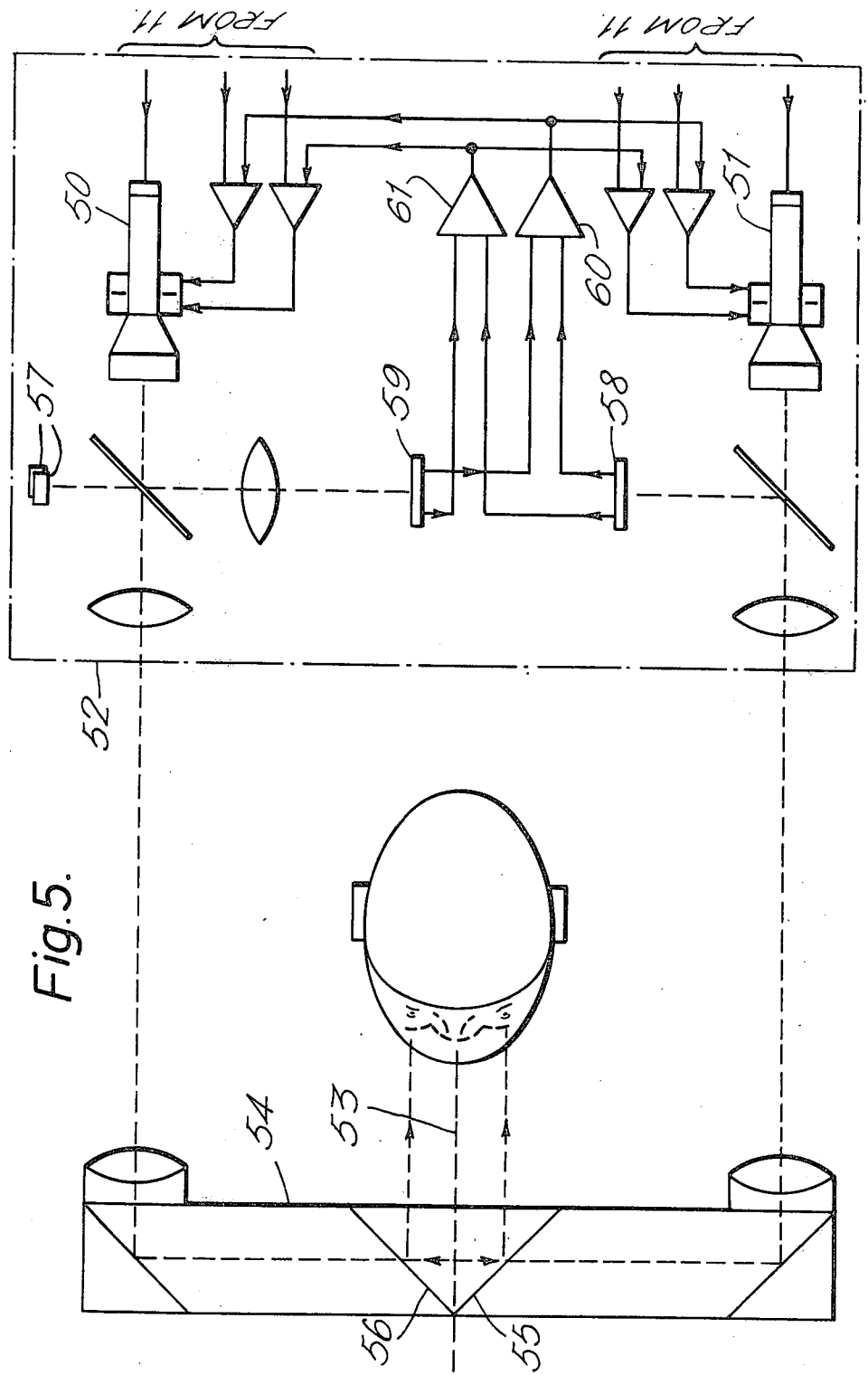
FIGS. 5 and 6 serve to illustrate modifications of the display system of FIGS. 1 and 3.

The system of FIG. 5 is a dual projection system in which two cathode-ray tubes are utilized to provide a wider field of view in azimuth and also, by duplication, a degree of redundancy against display-equipment failure.

Referring to FIG. 5, images of the display provided by the two cathode-ray tubes 50 and 51 in the display unit 52 are reflected into the pilot's line-of-sight 53 through the combiner unit 54, from partially-transparent reflectors 55 and 56 respectively; the two display-images overlap slightly to provide binocular vision. One or more light-emitting diodes 57 provide additional light images for closed-loop control via electro-optical position sensors 58 and 59 and differential amplifiers 60 and 61.

Figure 6:
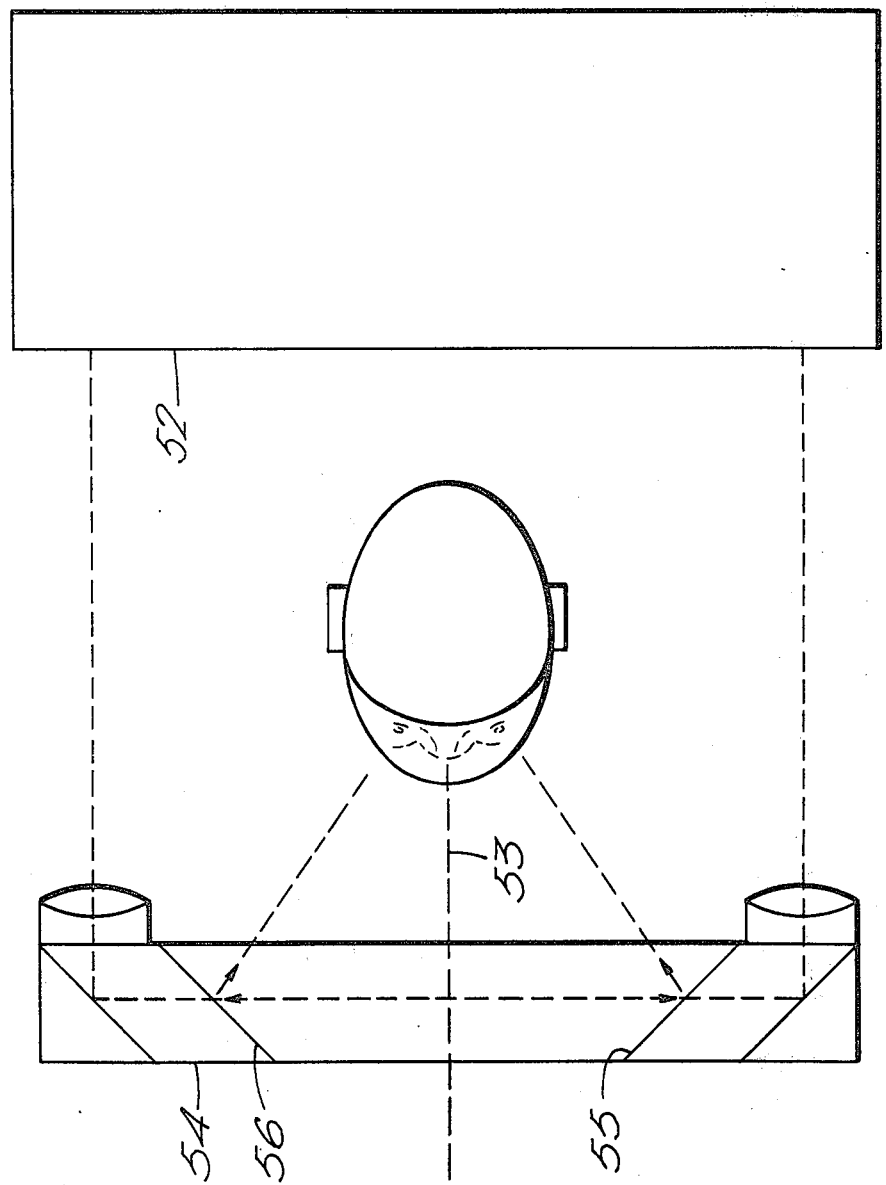

FIG. 6 illustrates a modification of the system of FIG. 5 in which the reflectors 55 and 56 are separated in order to afford dual peripheral head-up display, that may be utilized, for example, to supplement a primary head-up display in the normal line-of-sight 53 forward of the aircraft.

I claim:

1. A display system comprising a display unit for providing a display representation in a display area, an optical element, means for deriving an image of said display representation via said optical element, sensor means, said sensor means responding to displacement of said image from a reference established with respect to the said display unit, and modifying means, said modifying means being arranged to modify the disposition of said display representation in said display area in accordance with the response of said sensor means to displacement of said image from said referemce such as to compensate for movement of said optical element relative to said display unit.

2. A display system according to claim 1 including second means for deriving within said display unit, a second image of said display representation, said reference being provided by said second image.

3. A display system according to claim 1 wherein said display unit includes a cathode-ray tube, the said display representation being provided on the screen of said cathode-ray tube.

4. A display system according to claim 3, wherein said modifying means is arranged to adjust the deflection of the cathode-ray beam in said cathode-ray tube in accordance with the response of said sensor means.

5. A display system according to claim 1 wherein said display representation is for viewing by an observer, said optical element including a partially-transparent reflector, and means mounting said partially-transparent reflector to reflect an image of said display representation to said observer.

6. A display system according to claim 1 including means mounting said display unit in an aircraft, signal generating means for generating signals in accordance with aircraft flight parameters, and means supplying said signals to said display unit to provide a display of symbology representative of said aircraft flight parameters.

7. A display system comprising a display unit for providing a display; an optical element; first sensor means; means for directing an image of said display onto said first sensor means via said optical element; said first sensor means providing an output in accordance with position of the said image; second sensor means; means mounting said second sensor means within said display unit; means for directing within said display unit, a second image of said display onto said second sensor means, said second sensor means providing an output in accordance with position of said second image; and modifying means, said modifying means being arranged to modify said display in accordance with the difference in outputs of said first and second sensor means such as to compensate for movement of said optical element relative to said display unit.

8. A display system according to claim 7, wherein said first and second sensors include an array of photo-responsive devices.

9. A display system according to claim 7 including a light source, means mounting said light source with said display unit, means for directing an image of said light source onto said first sensor means via said optical element, and means for directing an image of said light source within said display unit and onto said second sensor means.

10. A display system according to claim 9, wherein the said light source is located at a position spaced from the centre of the said display.

11. A display system according to claim 7, wherein said display is for viewing by an observer and wherein said optical element includes a partially-transparent reflector, and means mounting said partially-transparent reflector to reflect an image of said display to said observer.

12. A display system according to claim 7 including means mounting said display unit in an aircraft, signal generating means for generating signals in accordance with aircraft flight parameters, and means supplying said signals to said display unit to provide a display of symbology representative of said aircraft flight parameters.

13. A vehicle display system comprising a display unit for providing a display; means mounting said display unit on said vehicle; an optical element, said optical element including a partially-transparent reflector; means mounting said optical element on said vehicle independently of said display unit so as to reflect an image of said display; said display unit including a cathode-ray tube for providing said display, first sensor means, means for directing an image of said display onto said first sensor means via said optical element, said first sensor means providing an output in accordance with position of said image, second sensor means, means for directing within said display unit, a second image of said display onto said second sensor means, said second sensor means providing an output in accordance with position of said second image; and modifying means, said modifying means modifying the position of the display on said cathode-ray tube in accordance with the difference in outputs of said first and second sensor means caused by difference in position of the two images, such as to compensate for movement of said optical element relative to said display unit.

* * * * *